Patented June 30, 1953

2,643,958

UNITED STATES PATENT OFFICE 2,643,958

TEXTILE PRINTING PASTE AND METHOD OF COATING THEREWITH

Helmut Kleiner, Opladen, Otto Bayer, Leverkusen-Bayerwerk, and Benno Becht, Leverkusen-Wiesdorf, Germany, assignors to Farbenfabriken Bayer Aktiengesellschaft, Leverkusen, Germany, a corporation of Germany No Drawing. Application September 22, 1949, Serial No. 117,262. In Germany August 3, 1949

13 Claims. (Cl. 117—63)

The present invention relates to improvements in the printing and dyeing of textiles of any kind with pigment dyestuffs and more particularly it relates to a novel printing paste.

This application is a continuation-in-part of our copending application Serial No. 105,068, filed July 15, 1949.

According to the hitherto known processes for printing and dyeing textiles with pigments, for the most part ready made, film-forming compositions are uses as binders. These binders have to be water insoluble in order to ensure a fixation of the pigments that is fast to washing. Therefore, the film-forming agents must be employed in the printing or padding pastes either in the form of a solution in organic solvents or in the form of an aqueous suspension or emulsion in a mixed aqueous-organic medium. The additional use of organic solvents causes many inconveniences in print and dye works. On the other hand, printing or padding pastes containing film-forming agents in the form of pure aqueous emulsions are only insufficiently stable and, furthermore, have the disadvantage that the binder does not penetrate sufficiently deeply into the fiber, as these emulsions are broken immediately on contacting the fabric, the fastness properties being impaired thereby.

It has also been proposed to produce the film-forming agent on the fiber, viz. from components which are added to the printing pastes or padding solutions in a water-soluble condition, for instance, from phenol and formaldehyde. Films thus obtained, however, possess poor mechanical properties. In particular they are too brittle and in consequence thereof fastness to rubbing is poor. Furthermore, film-forming compositions of this kind can be obtained only under very severe conditions. Such processes, therefore, have not proved to be useful in practice.

It is therefore an object of our invention to provide a binding agent for the pigment or dyestuff soluble in aqueous printing or padding pastes.

A further object resides in the provision of binding agents readily convertible into insoluble, supple and elastic films on the fibrous material.

Another object is to provide a printing paste which will fix the pigment on the fabric fast to washing and which will not impair the feel or "hand" of the goods.

A still further object of the invention is to provide a process of decorating textile fabrics.

Still further objects will become apparent as the following specification proceeds.

The objects of the invention are accomplished by using as a printing paste a composition having the following characteristics:

(a) As film-forming compositions, resinous polyamines having recurring basic radicals selected from the group consisting of primary and secondary amino groups, which polymers as such are water insoluble but yield water-soluble salts with acids, (b) They are present in printing and padding pastes in form of such salts in aqueous solutions, (c) The printing and padding pastes, furthermore, contain polyfunctional compounds capable of reacting with amino or imino groups (hereinafter called cross-linking agents).

Printing or padding pastes prepared according to the foregoing recipe and containing apart from the pigment dyestuffs the usual additions, such as thickening agents, glycerine etc., are stable at ordinary temperature for some days, or even for some weeks, which renders them suitable for practical application in print and dye works. Their stability is due to the fact that the reactivity of the polymers containing amino- or imino groups is checked by salt formation with the acids and that the cross-linking agents are present in an undissolved state. The stability of such printing or padding pastes, however, can be overcome in a simple way as soon as they have been applied to the textiles to be printed or dyed. The printed or padded material, for instance, can be subjected to an alkaline aftertreatment. By this treatment the film-forming compositions on the fiber are set free from their salts in an insoluble state, and by liberating the basic groups the conditions are provided for the additional cross-linking reaction with the compounds described sub (c).

Another processing method of our invention consists in employing the resinous polyamines in the form of their water-soluble salts with volatile acids. In this case, precipitation of the film-forming composition upon the fiber and subsequent cross-linking can be effected simply by drying, since the volatile acids evaporate and by setting free the basic groups provide the conditions required for cross-linking. Which way is the better depends on the special conditions of the printing or dyeing process concerned. For instance, preference is given to the alkaline development, if printing is effected in combination with dyestuffs other than pigments, for instance, vat or coupling dyes which per se require an alkaline aftertreatment, or if a wet operation is necessary for achieving a special finishing effect.

As volatile acids, acetic acid and formic acid are preferred.

The process according to the present invention combines the advantages of the known processes referred to above without exhibiting the disadvantages thereof. The use of organic solvents can be dispensed with and the process can be performed in a purely aqueous medium. The film-forming compositions are soluble in the aqueous printing or padding pastes and, therefore, easily penetrate the fiber. Furthermore, they become insoluble by the alkaline aftertreatment or heating in the presence of cross-linking agents and consequently insure a fixation which is fast to washing, acids and alkalies. Despite the cross-linking the film-forming compositions are distinguished by good elasticity and suppleness, properties characteristic for polyvinyl ester, so that a good fastness to rubbing is guaranteed and the feel of the fibrous material is not impaired. Fixing by drying already takes place at moderate temperatures of, for instance, about 60–80° C. within a few minutes. Fixing by an alkaline aftertreatment is also carried out within a few minutes.

Such compounds are suitable as binders as contain two or more primary or secondary amino-groups and which are just soluble in water per se or in the form of their salts, their solubility being so adjusted that it can be removed easily and completely by a cross-linking-reaction.

It is necessary to produce an insoluble, high molecular weight film on the textile material, which should preferably also be fixed in the textile material. Reaction components should therefore be used, which are not too macromolecular, since compounds of too high a molecular weight do not penetrate sufficiently into the textile material.

The effect desired may be obtained with various polyamines and various cross-linking-agents. Of the polyamines those having a comparatively high molecular weight possess the solubility characteristics mentioned above. As a lower limit a minimum molecular weight of about 200 appears necessary. The maximum molecular weight is limited by the beginning of insolubilization of the macromolecular polyamine. The molecular weight and reactivity of each polyamine should be adjusted to the molecular weight and reactivity of each cross-linking-agent. If the polyamine for instance has a low molecular weight and only a few reactive groups, the cross-linking-agent should have a great number of reactive groups. In those cases where the amine has the character of a macromolecular compound fewer or less active reactive groups in the cross-linking agent are sufficient. Polymeric amines obtained by polymerization are preferred.

Obviously, the resinous polyamine should be free from groups other than the primary or secondary amino groups, which other groups would preferentially react with the polyfunctional compound, since such reaction would impair the desired cross-linking reaction of the amino groups.

Among the resinous polyamines suitable as binders according to our invention are the polymeric esters containing amino- or imino groups, preferably those derived from acrylic or methacrylic acid ester. Naturally further components, such as vinyl esters, styrene or butadiene, may be copolymerized therewith. Furthermore, copolymers of other esters, for instance fumaric or maleic acid ester, with the above polymerization components may be employed. The amino- or imino groups can be introduced into the polymeric esters in various ways. For instance, acrylic ester may be subjected to copolymerization with acrylonitrile, and the nitrile groups of the polymer then totally or partly reduced to amino groups. Another way consists in copolymerizing acrylic ester with acrylamide, adding the copolymer obtained to an acrylonitrile polymer and then reducing the nitrile group to an amino group. Other possibilities consist in reacting polyacrylic ester and ethanol amine and adding acrylonitrile or cyanoethyl isocyanate or ethylene imine to the hydroxyethyl amide groups obtained, amino groups being formed either directly or after subsequent reduction. Still another possibility consists in first partially saponifying the polyacrylic ester and then causing it to react with cyano-ethyl-isocyanate. In this case a carbonamide link is formed with the evolution of carbon dioxide, the cyano group introduced being later reduced to an amino group. A particularly simple method for the production of the starting materials consists in condensing polymers containing ester groups with bi- or polyfunctional amines, such as ethylene diamine, diethylene triamine, tetramethylene diamine, hexamethylene diamine, N-methylpropylene diamine, N-isobutylpropylene diamine and diamines with hetero-atoms or hetero groups, such as diaminodipropylether, until a state is reached where the components are already chemically combined but are still soluble in aqueous acids or organic solvents or fusible. This intermediate stage can easily be maintained. Preferably the components are heated in the presence of an organic solvent for this purpose.

Furthermore, useful polymers may be obtained by introducing basic groups into polymers, for instance, by polymerizing therewith compounds capable of reaction with di- or polyamines in such a manner that basic groups remain in the final product. As an example of the many possibilities may be mentioned the interpolymerization of styrene and acrylfluoride and the subsequent reaction of the interpolymer with a diamine, for instance methyl-propylene-diamine, in the molecular proportion 1:1.

Furthermore polymers containing groups capable of reduction or hydrogenation, for instance nitro- or nitrile-groups may be converted into basic polymers by the action of nascent or catalytically activated hydrogen.

According to Patent No. 2,122,707 it is possible to render polyvinylmethylketones basic and watersoluble by reaction with ammonia. These basic resins may be made insoluble by heating. If they are cross-linked with bifunctional compounds according to the present invention, they can be fixed much more quickly and much more effectively.

Furthermore polyacrylic acid nitrile may be converted into watersoluble derivatives—probably basic amidines—by the action of boiling polyamines, for instance ethylene diamine.

Polyvinylamines may be obtained by saponification of polymeric vinyl succinimide or vinyl phthalimide by means of hydrazine hydrate, preferably according to the process of Reynolds (J. Am. Chem. Soc. 69/4, page 911).

Basic polyesters may be obtained from isocyanate modified polyesters, as they are for instance described in the co-pending application Serial No. 70,598, filed January 12, 1949, by Müller et al., by reaction with di- or polyamines.

Furthermore all those high molecular weight compounds are suited for the process according to the invention in which halogen atoms may be exchanged for amine groups, for instance in chlorinated polyisobutylenes, chlorinated paraffin hydrocarbons with about 12–20 carbon atoms.

A further class of compounds which may be employed according to the present invention are the polyimines, i. e. compounds which contain imino groups in their chain and which are accessible in various ways, for instance poylethylene imine may be obtained by polymerization of ethylene imine. By condensation of ethylene chloride with ammonia similar polyimines are accessible.

Furthermore basic polyamides may be mentioned as suitable binders. They may be obtained by the reaction of di- or polycarboxylic acids containing iminogroups or their esters with di- or polyamides or of di- or polyamines containing iminogroups with di- or polycarboxylic acids or their esters. As an example of the first named principle of reaction the condensation product from iminodipropionic acid and ethylenediamine may be mentioned:

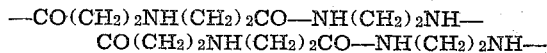

For the second named group of compounds the reaction products of oxalic acid ester with diethylene triamine may be taken as an example.

Similarly basic polyurethanes may be employed according to the invention such as they are for instance obtained from N-acetyl-diethanolamine and hexamethylene diisocyanate with subsequent splitting off of the acetyl group.

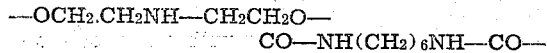

Long chain compounds containing iminogroups may also be obtained by linking high molecular polyamines. Thus, polybasic compounds such as are obtained by the addition of bifunctional amines to acrylonitrile and subsequent hydrogenation, may be linked to yield long chain compounds by reaction with diisocyanates, dicarboxylic acids, dichlorides, diacrylamides etc. For instance hexamethylene diamine is added to acrylonitrile on both sides and hydrogenated. The addition of the reaction product to a further acrylonitrile molecule and subsequent hydrogenation is repeated several times until the desired product is obtained:

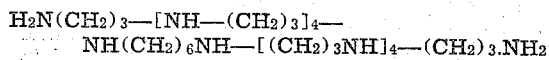

which for instance may be prolonged by further reaction with one of the following bifunctional compounds:

(a) Oxalylchloride, oxalic acid ester or the like
(b) diisocyanates, for instance hexanediisocyanate
(c) diacrylamides, for instance n-methyldipropylenetriamine diacrylamide.

Basic polymers may also be obtained which may be used according to the invention by the reaction of polybasic compounds with trifunctional compounds like Spermin ($\omega.\omega'$-diaminodipropyl-diaminobutane) with the trimeric reaction product of formaldehyde and acrylonitrile (hexahydro-1,3,5-triacrylyl-s-triazine) having the following probable formula:

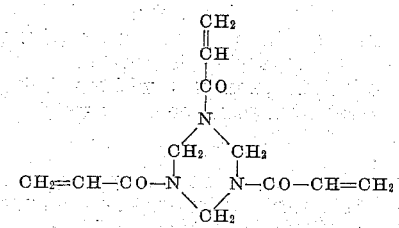

Furthermore the following compounds may be employed as basic binders: basic polysaccharides, for instance so-called amine cellulose, addition products of ethylene imine and cellulose, hydrolysates of protein substances, for instance hydrolysates from glue, casein, or gelatine, and aminolysates with polyamines.

Further monomeric polyamines which are suitable as binders are the reaction product of epichlorohydrine and ammonia, the hydrogenation products of compounds obtained by the reaction of the hydrogenation product of the compound obtained by the reaction of pentaerythrite and four mols of acrylonitrile, acrolein and ammonia or amines, the reaction product of the acetal of chloroacetaldehyde and ammonia, the reaction products of glycerol-tri-sulfuric-acid-ester and amonia, the polyamines obtained by the reaction of di- or triallylamine with ammonia in the presence of sodium, etc.

The binders may be used as free bases in aqueous or substantially aqueous solution. Preferably, however, the aqueous solutions of their salts are employed in order not to impair the stability of the treating solutions (printing pastes, slopping pastes, impregnating solutions etc.) by premature reaction of the bases with the polyfunctional compounds. The salts of volatile acids are especially suitable as the volatile acids evaporate during the drying of the impregnated textiles and cross-linking starts immediately. Non-volatile acids may be employed if the basic groups are set free by an alkaline after-treatment, especially in those cases, where an alkaline after-treatment is necessary in the course of the printing or dyeing process.

As polyfunctional cross-linking-agents compounds may be employed which contain two or more radicals capable of reaction with primary or secondary amino groups. Suitable compounds are for instance the so-called "polyisocyanate-formers." By polyisocyanate-formers compounds are understood, which react like polyfunctional isocyanates at elevated temperatures (cf. French Patent 876,285). As examples may be named addition products of one mol of a diisocyanate and two mols of a 1.3-diketone or 1.3-ketoneester like acetic acid ester or maleic acid ester. Especially well suited are the addition products of bisulfites and polyfunctional isocyanates which possess the advantage of being water soluble.

The condensation product obtainable from acrylonitrile and anhydrous formaldehyde or its polymers in the presence of acetic acid anhydride and acid condensation agents, for instance, sulfuric acid, and corresponding to the chemical composition $C_{12}H_{15}O_3N_3$ has proved to be a specially suitable cross-linking agent. This product presumably represents a triazine derivative and is hereinafter called "hexahydro-1.3.5-triarylyl-s-triazine." It is hardly soluble in an aqueous medium at room temperature, but dissolves quickly at higher temperatures.

When volatile acids are employed we have found that the volatile acids are preferably used in an amount in excess of that necessary for dissolving the resinous polyamines. Stability of the printing and padding pastes is improved thereby.

Our present invention is further illustrated by the following examples without being restricted thereto, the parts being by weight:

*Example 1*

1000 parts of acrylic acid butyl ester are diluted with 1000 parts of butanol and polymerized at 100 °C. with the addition of 0.5% of benzoyl peroxide. The polymerisate thus obtained is heated to the boil in a 50% butonal solution with 1-amino-3-methylamine propane, (the ratio of the diamine to one ester group being 1:1), until a sample has become soluble in dilute acetic acid, about 18 hours being required therefor. After separating the solvent and the non-reacted amine the residue is washed with water and dissolved in dilute acetic acid with an excess of about 20% of the calculated amount of acid to yield a 40% aqueous viscous solution.

A printing paste containing:

200 parts of the above 40% acetic acid solution
200 parts of a 20% pigment dyestuff paste
16 parts of finely powdered hexahydro-1,3,5-triacrylyl-s-triazine
300 parts of tragacanth thickening 65:100
284 parts of water is printed upon a cotton fabric. After printing it is dried and the fabric is exposed to a temperature of 60–100° C. for 10–5 minutes. Besides a good feel, the printing design thus obtained exhibits excellent fastness properties.

*Example 2*

A fixation of pigments according to the pad-dyeing process which is fast to washing is accomplished in the following manner:

50 parts of tragacanth thickening 65:100 are stirred with 50 parts of the acetic acid solution of the basic ester as described in Example 1 and 10 parts of hexahydro-1.3.5-triacrylyl-s-triazine into a level paste and diluted with 390 parts of cold water. About 10 parts of a 20% pigment dyestuff paste are stirred with 400 parts of water and added to the first solution through a fine hair sieve. A mixed fabric of cotton and viscose rayon is passed through this padding liquor on a two-bowl padding machine, dried and heated as described in Example 1. A dyeing is obtained with a good handle, excellent levelling and fastness. The resistance of the fabric to abrasion is improved by the pad-dyeing.

*Example 3*

The following resist is printed on cotton fabrics:

300 parts of tragacanth 65:100
200 parts of the acetic acid solution of Example 1
200 parts of a 20% pigment dyestuff paste
16 parts of powdered hexahydro-1.3.5-triacrylyl-s-triazine
40 parts of anhydrous sodium acetate
50 parts of zinc oxide
170 parts of water It is then briefly dried and slop-padded with the following mix:

30 parts of the dyestuff according to Schultz's dyestuff table, seventh edition, No. 1314
650 parts of water
30 parts of ammonium thiocyanate 1:1
50 parts of tragacanth 65:100
30 parts of sodium chlorate 1:2
10 parts of ammonium vanadate 1:100

Thereafter it is dried, steamed for 5 minutes, washed and soaped with soda at the boil. Fixation of the binding agent is carried out at the same time as the developing and fixing of the dyestuff from the leuco-sulfuric acid ester on steaming. According to this method, a colored resist of excellent fastness is obtained.

*Example 4*

A plastic colored resist under Variamine Blue which is fast to washing is obtained as follows:

(a) Impregnating a fabric with 12 parts of o-oxy-β-naphthoic acid anilide per 1000 parts of water on a two-bowl padding machine, drying and (b) Printing with 350 parts of tragacanth 65:1000
200 parts of the 40% acetic acid solution of Example 1
200 parts of a 20% pigment dyestuff paste
16 parts of finely powdered hexahydro-1.3.5-triacrylyl-s-triazine
100 parts of lactic acid
100 parts of water drying;

(c) Developing with 20 parts per 1000 parts of water of the acid salt of the diazo compound from 4-amino-4'-methoxydiphenylamine by running once through a padding machine, short air passage, passing the goods through a hot bath which contains 10 parts of sodium bisulphite per 1000 parts of water. The fabric is then washed and subsequently soaped with soda at the boil, washed and dried. Fixation of the pigment dyestuff is caried out partly by drying and partly in an alkaline soap bath.

*Example 5*

A cotton fabric is printed with a mix consisting of:

200 parts of tragacanth 65:100
200 parts of the 40% acetic acid solution of Example 1
200 parts of a 20% pigment dyestuff paste
16 parts of finely powdered hexahydro-1.3.5-triacrylyl-s-triazine
75 parts of anhydrous sodium acetate
150 parts of zinc oxide 1:1
174 parts of water thereafter dried and the printed fabric is padded on a foulard with a padding solution containing 85 parts of aniline hydrochloride
40 parts of tragacanth 65:100
5 parts of aniline dissolved in 220 parts of water
54 parts of potassium ferrocyanide dissolved in 220 parts of water
30 parts of sodium chlorate dissolved in 220 parts of water thereafter it is dried and subsequently steamed for 3 minutes in a rapid ager and, at last, soaped with soda at the boil. There is obtained a colored resist under aniline black which is distinguished by brilliancy, sharp outlines and excellent fixation of the pigment dyestuff.

*Example 6*

A colored resist is obtained in the simplest manner by printing a fabric as described in Example 1, drying, slop-padding and further treating as described in Example 2.

Example 7

An interpolymer containing 90 parts of styrene and ten parts of acrylfluoride, dissolved in 100 parts of benzene is added drop by drop to a solution of 30 parts of methylpropylenediamine:

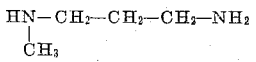

in 100 parts of butanol. After the reaction is finished the solution is steam-distilled, the residue washed with water, precipitated from acetic acid solution with soda lye, washed and dried. The material thus obtained contains about two per cent basic nitrogen which can be determined by titration. It is soluble in dilute acetic acid with weak opalescence.

A printing paste containing:

250 parts of tragacanth thickening $65/1000$
400 parts of a 20 per cent weakly acetic acid solution of the basic polystyrene
200 parts of hexahydro-1,3,5-triacrylyl-s-triazine
130 parts of water is printed upon a cotton fabric. After printing, drying follows at 100° C. The printing design thus obtained exhibits excellent fastness properties.

Example 8

An unsized paper foil is immersed in a 20 per cent solution of the acetate of the basic polystyrene of Example 1, containing 20 per cent of hexahydro-1,3,5-triacrylyl-s-triazine (calculated on the weight of the basic polystyrene) as a cross-linking agent, centrifuged and dried at 80° C. By this treatment the paper foil has become resistant to ink and no flushing occurs.

Example 9

160 parts of a polyester from adipic acid and ethyleneglycol with an hydroxyl number of 62 and an acid number of 0.6 is freed from water at 130° C. in vacuo and 30 parts of hexanediisocyanate are added at 100° C. After stirring for an hour (the content of NCO is 3.96 per cent as calculated) the solution is diluted with 160 parts of chloroform and 17 parts of methylpropylenediamine in 100 parts of chloroform are added. Then the solvent is distilled off and the residue, containing about 1.5 per cent of basic nitrogen capable of being determined by titration, is dissolved in a solution of water and the calculated quantity of acetic acid to yield a 40 per cent paste.

A printing paste, containing 350 parts of tragacanth thickening $65/1000$
250 parts of a 40 per cent weakly acetic acid solution of the basic polyester
200 parts of a 20 per cent pigment dyestuff paste
20 parts of hexahydro-1,3,5-triacrylyl-s-triazine
230 parts of water is printed upon a cotton fabric. After printing it is dried at 120° C. The printing design thus obtained is resistant to light and washing and the material has a soft hand.

Example 10

70 parts of vinylsuccinimide (M. P. 42° C.) obtained by addition of succinimide to acetylene, are mixed with 0.5 per cent of benzoylperoxide and polymerized at 100° C. with cooling. The weakly yellow, brittle polymer is heated for 18 hours to 120° C. with 200 parts of hydrazinehydrate, then precipitated and washed with alcohol. The polybasic compound obtained is diluted with the calculated quantity of acetic acid to yield a ten per cent viscous solution.

A printing paste, containing 200 parts of tragacanth thickening $65/1000$
300 parts of a ten per cent solution of the acetate of the above polyvinylamine
250 parts of a 20 per cent pigment dyestuff paste
60 parts of hexahydro-1,3,5-triacrylyl-s-triazine
190 parts of water is printed on a cotton fabric. After printing the material is heated for 15 minutes to 100° C. The printing design thus obtained is fast to light and washing.

Example 11

A polyamine obtained by reaction of chlorinated polyisobutylene (with a content of 26 per cent Cl) with ammonia under pressure, having a content of about two per cent of basic nitrogen, is dissolved in dilute acetic acid and twelve per cent of hexahydro-1,3,5-triacrylyl-s-triazine calculated on the weight of the polyamine) added. The resultant paste is applied to a staple rayon fabric by slopping. After centrifuging off the solution it is dried at 80° C. The fabric thus treated can be dyed with three per cent of "Fast Wool Blue BL" (Schultz Farbstofftabellen No. 974) in vivid blue.

Example 12

A cotton fabric is printed with a printing paste of the following composition: 50 parts of polyethyleneimine (50 per cent) are diluted with water to 200 parts. 200 parts of "Indanthrenbrown BR" (Schultz Farbstofftabellen No. 1227) (pigment dyestuff paste—20 per cent) are stirred into this solution and diluted with 400 parts of water. Then 75 parts of acetic acid (50 per cent) and 65 parts of the reaction product of potassium bisulfite and hexanediisocyanate are added, or instead, 60 parts of formaldehyde (30 per cent).

After printing the material is dried shortly and reacted for five minutes at 100° C. A brown print of excellent general fastness properties is obtained.

Example 13

15 parts of polyethyleneimine are dissolved in 45 parts of hot water, 30 parts of tragacanth thickening ($65/1000$) are stirred into the solution and the whole diluted with water to 500 parts. Ten parts of "Heliogenblue B" (Schultz Farbstofftabellen 7th edition, 2nd suppl. vol., page 195) pigment dyestuff paste (20 per cent) are mixed with 470 parts of water and added to the above solution. Then 25 parts of acetic acid (50 per cent) and 25 parts of hexahydro-1,3,5-triacrylyl-s-triazine are added. A cotton fabric is dyed with this padding mixture, dried and reacted for five minutes at 100° C. A dyeing of excellent uniformity and general fastness properties is obtained.

Example 14

A cotton fabric is printed with: 50 parts of polyethyleneimine (50 per cent), dissolved in 150 parts of water, 50 parts of methyl cellulose, 200 parts of "Hansayellow G" (Schultz Farbstofftabellen No. 84) (20 per cent), 100 parts of water, 75 parts of acetic acid (50 per cent), 60 parts of sodium acetate, dissolved in 120 parts of water, 130 parts of zinc oxide 1:1, 65 parts of the reaction product of potassium bisulfite and hexanediisocyanate.

After printing the fabric is dried shortly and heated for five minutes to 100° C. The material is then passed through a slopped liquor containing: 85 parts of anilinechlorohydrate, 40 parts of tragacanth 65/1000, five parts of aniline oil, 220 parts of water, 54 parts of potassium ferrocyanide dissolved in 200 parts of water, 30 parts of sodiumchlorate, dissolved in 320 parts of water.

After padding the material is dried, treated with steam for three minutes and oxidized with three grams of potassium bichromate and two grams of soda per liter for a minute and a half at 50° C. Then the material is rinsed and soaped boiling. In this manner a colored resist under aniline black with excellent properties is obtained.

Example 15

A solution is prepared, containing per liter 50 grams of the acetic acid salt of the addition product of three mols of $\omega,\omega'$-diaminodipropylenediaminobutane (Spermin)

to the reaction product of acrylonitrile and formaldehyde (hexahydro-1,3,5-triacrylyl-s-triazine), 58 parts of glyoxal (30 per cent) or 45 parts of hexahydro-1,3,5-triacrylyl-s-triazine (dissolved in a mixture of water and acetone). A glass fabric is impregnated with this solution, centrifuged, and heated for ten minutes to 150° C. The fabric is then dyed in an acetic acid solution with one per cent of "Wool Fast Blue BL" (Schultz Farbstofftabellen 1931, vol. I, No. 974). A fullshade, reddish blue dyeing of excellent fastness to water is obtained.

Example 16

A printing paste containing 150 parts of a basic polyamide, obtained from, oxalic acid-diethylester and dipropylenetriamine,
170 parts of acetic acid (30 per cent)
90 parts of water
200 parts of a 20 per cent dyestuff paste
350 parts of a tragacanth thickening 65/1000
40 parts of hexahydro-1,3,5-triacrylyl-s-triazine is printed on a cotton fabric. After printing it is dried and heated for five minutes to 100° C. A printing of excellent general properties is obtained.

Example 17

A plastic, colored resist of "Variamin-Blue" resistant to washing is obtained as follows:

(a) Grounding of a fabric with 12 parts o-hydroxy-β-naphthoic acid anilide per liter on a double-roller-padding machine and drying.

(b) Printing with 350 parts of tragacanth thickening (65/1000)
50 parts of polyethylene imine (50 per cent) dissolved in 150 parts of water
200 parts of a 20 per cent pigment dyestuff paste
65 parts of the addition compound of hexamethylenediisocyanate and potassium bisulfite
100 parts of lactic acid
110 parts of water
and drying.

(c) Developing with 20 grams of the hydrochloride of the diazo-compound of 4-amino-4'-methyoxydiphenylamine per liter in one passage over a slop-padding machine, a short passage through air, passing of the fabric through a hot bath, containing ten grams per liter of sodium bisulfite. After rinsing the fabric is soaped hot with soda, then rinsed again and dried. The fixation of the pigment dyestuff is caused partly by drying and partly by the alkaline soap bath.

We claim:

1. A textile printing paste comprising a pigment, a thickening agent, an aqueous solution of a salt formed from an acid and a resinous polyamine having recurring basic radicals selected from the group consisting of primary and secondary amino groups, and a polyfunctional compounds selected from the group consisting of isocyanate addition products capable of setting free a polyisocyanate upon heating and hexahydro-1,3,5-triacrylyl-s-triazine, said basic radicals being the groups in said resinous polyamine primarily capable of reacting with the polyfunctional compound.

2. A textile printing paste comprising a pigment, a thickening agent, an aqueous solution of a salt formed from a volatile acid and a resinous polyamine having recurring basic radicals selected from the group consisting of primary and secondary amino groups, and a polyfunctional compound selected from the group consisting of isocyanate addition products capable of setting free a polyisocyanate upon heating and hexahydro-1,3,5-triacrylyl-s-triazine, said basic radicals being the groups in said resinous polyamine primarily capable of reacting with the polyfunctional compound.

3. A textile printing paste comprising a pigment, a thickening agent, an aqueous solution of a salt formed from an acid and a basic polymer of an ester of an unsaturated aliphatic acid, the basic radicals in said polymer being selected from the group consisting of primary and secondary amino groups, and a polyfunctional compound selected from the group consisting of isocyanate addition products capable of setting free a polyisocyanate upon heating and hexahydro-1,3,5-triacrylyl-s-triazine, said basic radicals being the groups in said resinous polyamine primarily capable of reacting with the polyfunctional compound.

4. A textile printing paste as claimed in claim 3 wherein the unsaturated aliphatic acid is an acrylic acid, and the polyfunctional compound is hexahydro-1,3,5-triacrylyl-s-triazine.

5. A textile printing paste as claimed in claim 1 wherein the resinous polyamine is a basic linear polyamide.

6. A textile printing paste as claimed in claim 1 wherein the resinous polyamine is a basic polyurethane.

7. A textile printing paste as claimed in claim 1 wherein the resinous polyamine is a polyethylene imine.

8. A textile printing paste comprising a pigment, a thickening agent, an aqueous solution of the acetic acid salt of the reaction product of an aliphatic diamine with an acrylic acid ester polymer, and hexahydro-1,3,5-triacrylyl-s-triazine.

9. A textile printing paste comprising a pigment, a thickening agent, an aqueous solution of the acetic acid salt of the reaction product of 1-amino-3-methylamino-propane with polyacrylic acid butylester, and hexahydro-1,3,5-triacrylyl-s-triazine.

10. The process of decorating textiles, which comprises applying to said textiles a printing paste as claimed in claim 1, and then rinsing said textiles in an aqueous solution of alkali to remove the acid constituent from the polymer salt contained in said paste.

11. The process of decorating textiles which comprises applying to said textiles a printing paste as claimed in claim 2, and then heating said textiles to remove the volatile acid from the polymer salt contained in said paste.

12. The process of decorating textiles, which comprises applying to said textiles a printing paste as claimed in claim 3, and then rinsing said said textiles in an aqueous solution of alkali to remove the acid constitutent from the polymer salt contained in said paste.

13. The process of decorating textiles, which comprises applying to said textiles a printing paste comprising a pigment, a thickening agent, an aqueous solution of a salt formed from a volatile acid and a polymer of an acrylic acid ester, said polymer containing basic radicals selected from the group consisting of primary and secondary amino groups, and hexahydro-1.3.5-triacrylyl-s-triazine, and then heating said textile to remove the volatile acid from the polymer salt contained in said paste.

HELMUT KLEINER.
OTTO BAYER.
BENNO BECHT.

References Cited in the file of this patent

UNITED STATES PATENTS

| Number | Name | Date |
|---|---|---|
| 2,136,928 | Schlack | Nov. 15, 1938 |
| 2,223,930 | Griessbach et al. | Dec. 3, 1940 |
| 2,468,713 | Kropa | Apr. 26, 1949 |
| 2,486,190 | Minsk et al. | Oct. 25, 1949 |
| 2,526,639 | Cupery | Oct. 24, 1950 |

OTHER REFERENCES

Ser. No. 361,011, Pense et al. (A. P. C.), published May 11, 1943.